United States Patent

Garbini et al.

[11] 3,883,386
[45] May 13, 1975

[54] APPARATUS FOR CONTINUOUSLY JOINING OR PAPER PRINTING FLAT MATERIALS

[75] Inventors: Eraldo Garbini, Corbetta; Umberto Lissoni; Bruno Cislaghi, both of Magenta (Milan), all of Italy

[73] Assignee: Saer di Trezzi Edrige, Corbetta (Milan), Italy

[22] Filed: Mar. 20, 1972

[21] Appl. No.: 236,395

[30] Foreign Application Priority Data
May 25, 1971 Italy .................................. 22240/71

[52] U.S. Cl. .............. 156/380; 156/582; 219/10.49 219/10.79
[51] Int. Cl. ...... B29c 19/02; H05b 5/00; H05b 9/02
[58] Field of Search .......... 156/380, 372, 555, 583, 156/582; 219/10.69, 10.75, 10.79, 10.49, 10.61

[56] References Cited
UNITED STATES PATENTS

| | | | |
|---|---|---|---|
| 2,427,485 | 9/1947 | Wilson | 219/10.61 |
| 2,711,781 | 6/1955 | Langer | 156/380 |
| 2,839,651 | 6/1958 | Erickson | 219/10.79 |
| 3,187,152 | 6/1965 | Itoya | 219/10.79 |
| 3,223,027 | 12/1965 | Soda et al. | 156/583 |
| 3,547,742 | 12/1970 | Cottrell | 156/583 |
| 3,619,325 | 11/1971 | Hair | 156/380 |

Primary Examiner—Douglas J. Drummond
Attorney, Agent, or Firm—Stevens, Davis, Miller & Mosher

[57] ABSTRACT

An apparatus for continuously joining or paper printing flat materials, comprising two continuous belts between which the parts to be joined or printed are seized and compressed, at least one of said belts being a metal belt heated by means of induced electric current.

9 Claims, 5 Drawing Figures

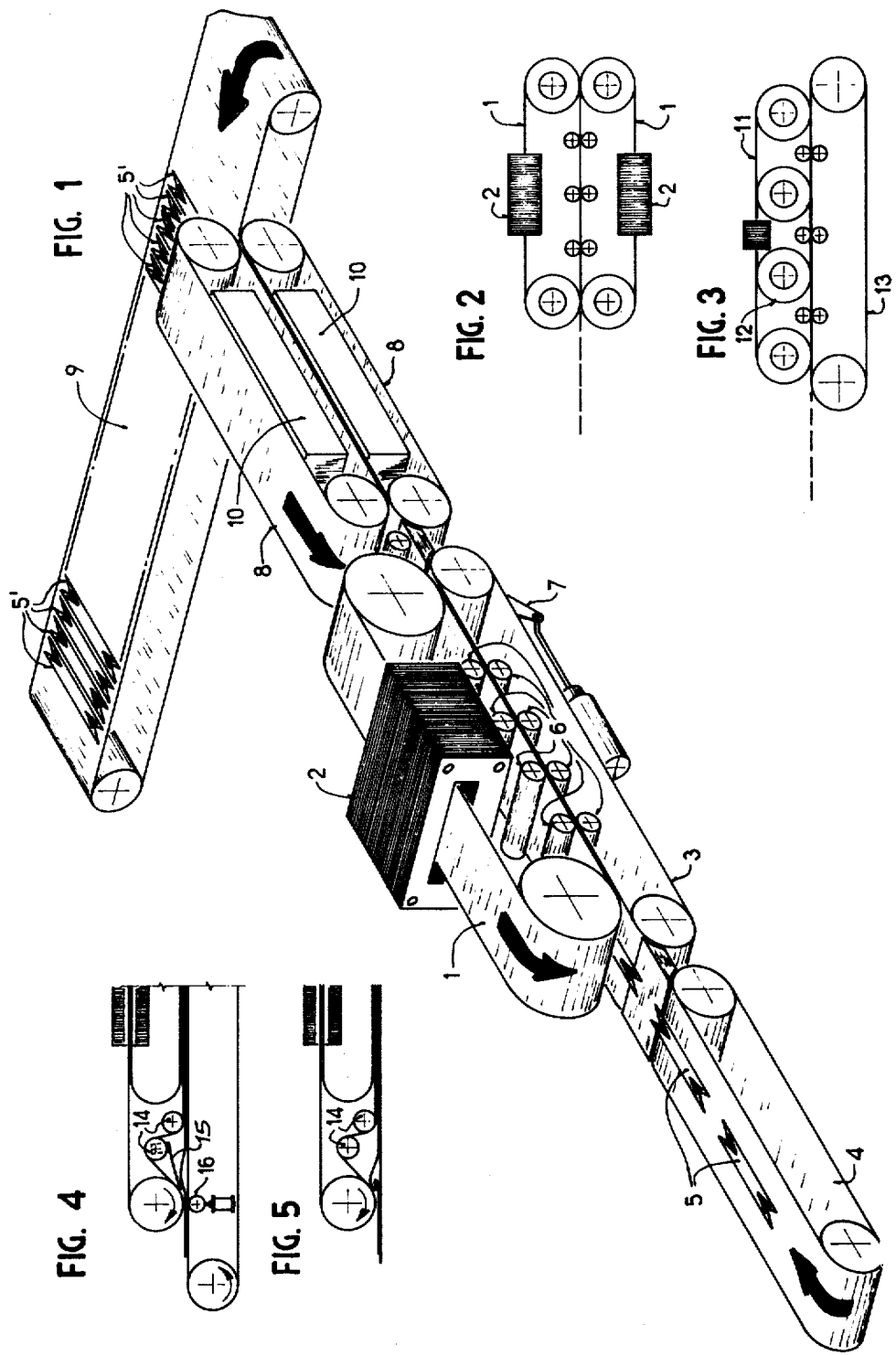

APPARATUS FOR CONTINUOUSLY JOINING OR PAPER PRINTING FLAT MATERIALS

The present invention relates to a new apparatus which makes possible the continuous joining or paper printing of flat materials, such as fabrics, sheets of paper, skins, sheets of synthetic material, thin sheets of metal, sheets of plywood etc.

Hereinafter for simplicity of description we shall refer only to the case in which the apparatus according to the invention is used for joining fabrics with so called thermo-adhesives or interlinings. However the manner in which it can be equally well used for a whole series of applications demanding similar service and operation will be immediately evident to an expert in this field.

In latter years the techniques of ready made clothing have been oriented towards the replacement of many of those parts of articles of clothing consisting of a number of layers of fabric sewn together by layers of fabric glued together, resulting in an evidently large saving of labor and an increase in productivity.

To this end so-called thermo-adhesive fabrics are available on the market which have been treated on one side with special adhesives whose characteristic is the development of their adhesive power at high temperatures, for example between 120° and 200°C. On cooling, these adhesives form a stable bond between the normal fabric and the thermo-adhesive fabric which is also resistant to the successive washing and ironing operations.

The joining process heretofore indicated has up to the present time been executed in discontinuous presses consisting essentially of a resting plane (On which the normal fabric and one or more layers of thermo-adhesive fabric with its side covered with adhesive facing inwards are disposed in order) and a pressing plane heated by electrical resistances.

Discontinuous apparatus of this type gives rise to the disadvantages of low joining efficiency, which reflects negatively on the cost of the finished product, and of imperfectly uniform heating of the heated plate, which results in an imperfectly uniform joining of the thermo-adhesive fabrics.

The object of the present invention is an apparatus which makes possible the continuous joining of normal and thermo-adhesive fabrics, with absolutely uniform heating, thus obviating the aforementioned disadvantages inherent in presently known appratus.

The objects of the present invention are attained by an apparatus comprising two continuous belts between which the parts to be joined are seized and compressed, one at least of said belts being of a material which conducts current and heated by means of induced electric current.

In a preferred embodiment, the continuous belts are two superimposed conveyor belts of which the upper one is a belt of any metal of low electrical resistance, disposed in such a manner with respect to the primary winding of a transformer as to constitute its secondary winding and be hence traversed by an induced current when the primary is connected to the main electrical supply at a frequency for example of 50 Hz. The intensity of the induced current is predetermined according to the desired temperature.

In this manner a very fast and uniform heating of the whole belt is obtained.

In other words, having fixed the temperature to which the metal joining belt is to be raised and having fixed the dimensions of the belt on the basis of the particular field of use to which it is to be put, it is necessary to size the transformer, of which said belt constitutes a secondary winding, such that it induces a current of the intensity necessary for raising the temperature of the metal belt to the desired value.

Moreover the upper conveyor belt is preferably lined with a material which is antiadhesive and resistant to heat in order to avoid any adhesion between the treated parts and the belt itself.

The lower conveyor belt may consist of any suitable heat resistant antiadhesive material.

In a further embodiment of the invention, both continuous belts are conveyor belts consisting of metal of low electrical resistance, each constituting the secondary winding of a transformer fed at low frequency and hence heated by means of induced current.

In this case both belts are preferably covered with antiadhesive material resistant to high temperatures.

In a third embodiment of the apparatus according to the present invention, the system of conveyor belts may be rendered independent of the continuous heating belts.

More precisely it is possible to provide one or two continuous metal belts (according to whether only upper heating or simultaneous upper and lower heating are required), which are heated by induction, are suitably sized and are fixed, and about which and in contact with which move two conveyor belts, preferably of antiadhesive heat resistant material, which feed the parts to be joined.

The advantages of this system of fixed heated belts with respect to the system of mobile heated belts may be thus summarized:

a. For supporting the fixed heated belts, pulleys are required of a smaller diameter than those necessary for moving belts, with an evident saving in the cost of the system.

b. The metal used for the fixed belts need only have the necessary electrical resistance characteristics, whereas it does not need to have particular mechanical resistance characteristics. It is thus possible to use less costly metals or metal alloys.

The following are examples of particularly suitable materials for the metal belts according to the invention: steels with an electrical resistance of about 0.20, phosphor bronze with an electrical resistance of about 0.05, and copper with an electrical resistance of about $0.03 \Omega mm^2/m$, etc.

In the case of mobile heated belts, steels are preferred for their mechanical resistance, but in the case of fixed belts less costly materials such as copper and phosphor bronze may be used.

Examples of antiadhesive heat resistant materials which may be used for constructing or lining the conveyor belts are fiber glass, Teflon and the like.

In addition to the continuous metal belts heated by electrical induction, and which constitute its characteristic part, the new apparatus according to the present invention also comprises the following essential parts:

1. Two sets of opposing rollers of which some are of fixed axis and others of mobile axis, disposed within the conveyor belts and in contact with them, and adjustable and controllable by compressed air in such a manner as to produce a basic pressing action on the parts to be heat joined.

2. The true pressing system for the parts to be heat joined, also comprising rollers adjustable and controllable by compressed air in the known manner, which may be inserted either in the end part of the conveyor belts in the heated zone or immediately after them and independent of them.

3. A continuous feed system for the thermo-joining machine.

4. A cooling system disposed downstream of the thermo-joining apparatus in which the manufactured articles are cooled so as to render the bond between the parts stable. Preferably said cooling system comprises two conveyor belts of metal mesh and cold air blowers.

5. In the case of fabrics or other materials which under the action of compression by the rollers in the heated zone undergo slight "drawing", i.e. slight deformation because of elongation, it is necessary to provide at the end of the upper (or lower) conveyor belt a loop housing a doctor which spreads out the fabric preventing it from creasing within the compression device. In the case of conveyor belts independent of the heated metal belts, since these belts are flexible the loop can be easily made by means of idle rollers.

If however the conveyor belts are heated steel belts and consequently belts which are too rigid for deviation through a loop, then a doctor must be provided at their extremity, and independent of them, before a compression device.

The invention will be more evident by reference to the accompanying diagrammatic drawings which illustrate various embodiments of the apparatus according to the invention by way of example. Equal or equivalent parts are identified in them by the same reference numeral.

FIG. 1 is a diagrammatic view of an apparatus for continuous joining or printing, in which the upper continuous belt is a conveyor belt of heated steel, whereas the lower belt is a simple conveyor belt.

FIG. 2 is a diagrammatic representation of a heat joining device of the type forming a part of the apparatus of FIG. 1.

FIG. 3 is a diagrammatic representation of a further modification of the heat joining device of this invention.

FIG. 4 is a detailed view of the end portion of the heat joining device of the type shown in FIG. 3.

FIG. 5 shows the possible creasing of fabrics being joined by continuously moving apparatus.

More precisely the apparatus of FIG. 1 comprises an upper heated conveyor belt 1, of steel lined with an antiadhesive heat resistant material (e.g. Fluorglas, a registered brand name), forming the secondary winding of the transformer 2; a lower conveyor belt 3 of antiadhesive material (or lined with said material); a conveyor belt 4 which continuously feeds articles 5 to the joining machine; a series of rollers 6, partly of fixed axis and partly of mobile axis, in contact with the conveyor belts in such a manner as to bring the normal and thermoadhesive fabrics to be joined into close contact; a final pressing device 7 for the articles to be heat joined, adjustable by compressed air or in any other known manner; a pair of conveyor belts 8, preferably of metal mesh, which form the cooling zone for the heat joined articles 5' discharged on to the conveyor belt 9; preferably cooling is effected by cold air blowers 10.

FIG. 2 is a diagrammatic representation of a heat joining device forming part of an apparatus of the type shown in FIG. 1, in which however both continuous belts 1 between which the articles to be joined are seized are conveyor belts of steel lined with antiadhesive material, heated by electrical induction by means of transformers 2. Preferably the upper belt is heated to a higher temperature than the lower belt. For example the upper belt may be heated to 180°C and the lower belt to 150°C.

FIG. 3 is a diagrammatic representation of a further modification of the heat joining device according to the invention in which the upper continuous belt 11 is simply a conveyor belt of antiadhesive material, whereas internal to it and in contact with it is disposed a metal belt 12 heated by electrical induction and fixed; the lower continuous belt 13 is also a simple conveyor belt, of heat resistant antiadhesive material.

In this case the heated metal belt may be for example of copper or phosphor bronze.

FIG. 4 shows a detail of the end of a heat joining device of the type shown in FIG. 3, intended for joining continuous fabrics or other materials which under the application of pressure at high temperature undergo a certain "drawing", i.e. they form a certain excess of fabric which would form creases, unable to be successively eliminated, between the final pressure rollers (FIG. 5). It can be seen that to avoid this disadvantage the upper conveyor belt is deviated by idle rollers 14 in order to form a loop which houses a flexible doctor 15 which smooths the fabric before its passage under the pressure roller 16.

The times and temperatures used in heat joining are those already used in known discontinuous apparatus. Generally, and depending on the materials treated, temperatures between 120° and 200°C and time between 10 and 25 seconds are used. In the case of fabrics which are afterwards subjected to ironing, it is preferable to effect heat joining at the upper temperature limits so as to avoid alterations occurring in the ready made clothes during successive treatment at higher temperatures.

As stated heretofore the apparatus according to the present invention, in addition to heat joining materials of various types, can be equally well used for printing fabrics by means of paper. This type of fabric printing has in fact been effected up the the present time by discontinuous presses of the type used for heat joining.

The use of the continuous apparatus according to the present invention for printing leads to a large increase in productivity with respect to known methods, and absolutely uniform printing. The times and temperatures used for printing are those used in known apparatus.

What we claim is:

1. An apparatus for continuously joining layers of fabric with interposed thermo-adhesive, comprising two continuous belts between which the parts to be joined are seized and compressed, at least one of said belts being a metal belt entirely heated by means of induced electric current, wherein the lower one of said two continuous belts is a conveyor belt, and the upper one of said two continuous belts is a fixed belt of metal having a low electrical resistance, said upper belt being disposed in such a manner as to constitute the secondary winding of a transformer fed with low frequency current.

2. An apparatus as claimed in claim 1, in which a conveyor belt of antiadhesive heat resistant material rotates about the fixed metal belt, and in contact with it.

3. An apparatus as claimed in claim 1, in which two sets of guide and pressure rollers are opposingly disposed internal to the continuous belts and in contact with them.

4. An apparatus as claimed in claim 1, in which a pressing device adapted to transmit the necessary compression to the articles to be heat joined is inserted in the end of the conveyor belts.

5. An apparatus as claimed in claim 1, in which a device for compressing the articles to be heat joined is provided at the end of the heat joining device, and distinct from it.

6. An apparatus as claimed in claim 5, in which the end of one of the two conveyor belts is deviated by means of idle rollers in such a manner as to form a loop housing a doctor for smoothing the heat joined fabric before it passes into the compression device.

7. An apparatus as claimed in claim 1, in which the fixed belt of metal having low electrical resistance comprises a material selected from the group consisting of: copper or phosphor bronze.

8. An apparatus as claimed in claim 1, additionally comprising means for continuously feeding layers of fabric with interposed thermo-adhesives to said belts.

9. An apparatus as claimed in claim 1, additionally comprising means for cooling layers of fabric with interposed thermo-adhesives, said cooling means located downstream from said belts.

* * * * *